Figure 1:
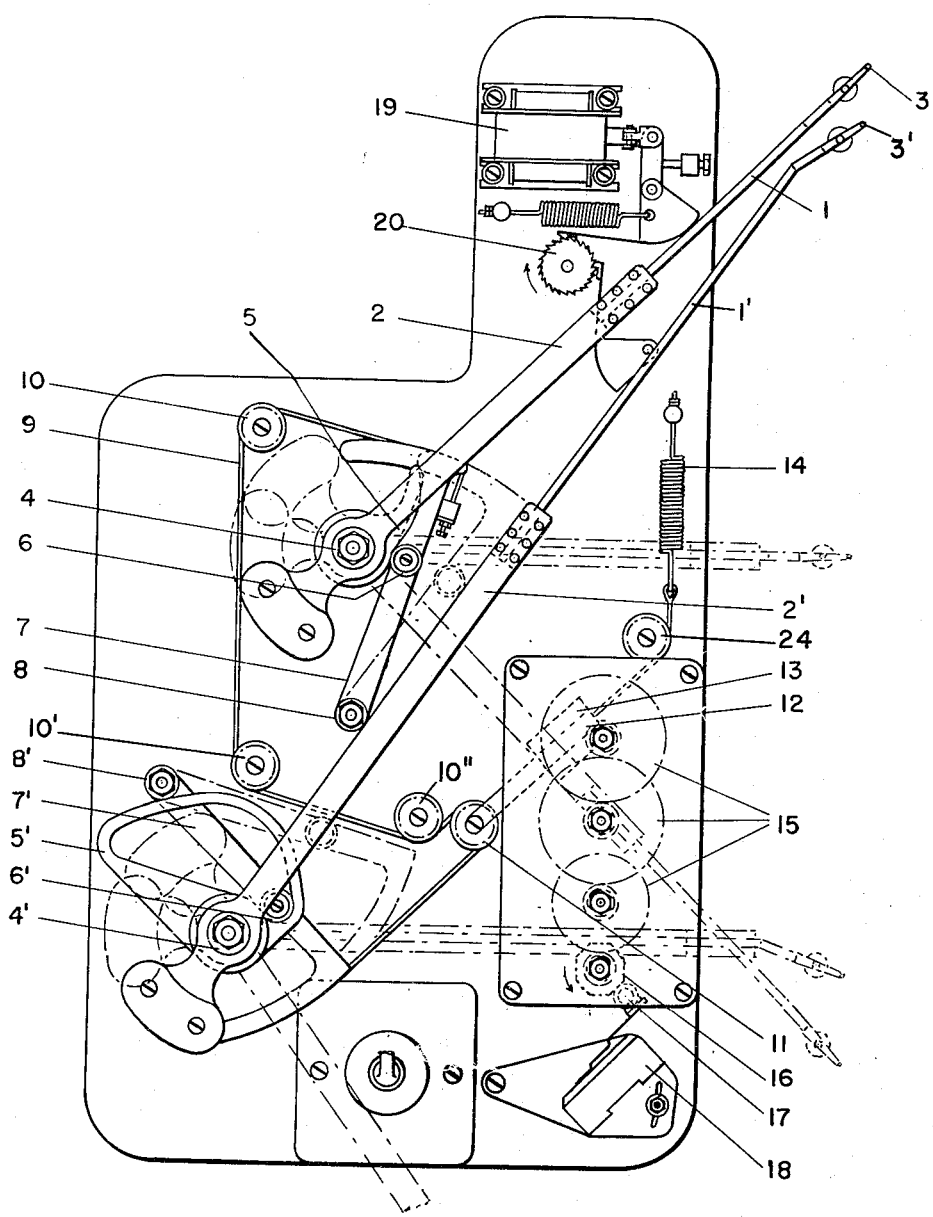

INVENTORS
JACK MITCHELL BUIST
GUILLAUME WARD JAMIN

Feb. 2, 1954   J. M. BUIST ET AL   2,667,699
APPARATUS FOR MEASURING EXTENSION OF SAMPLES UNDER TENSION
Filed Oct. 12, 1950                                2 Sheets-Sheet 2

INVENTORS
JACK MITCHELL BUIST
GUILLAUME WARD JAMIN

BY
Cushman, Darby & Cushman
ATTORNEYS

Patented Feb. 2, 1954

2,667,699

UNITED STATES PATENT OFFICE 2,667,699

APPARATUS FOR MEASURING EXTENSION OF SAMPLES UNDER TENSION

Jack Mitchell Buist and Guillaume Ward Jamin, Blackley, Manchester, England, assignors to Imperial Chemical Industries Limited, a corporation of Great Britain Application October 12, 1950, Serial No. 189,788

Claims priority, application Great Britain September 25, 1950

4 Claims. (Cl. 33—148)

This invention relates to an apparatus for measuring the extension under tension of a sample of rubber or the like and more particularly to such an extensometer for use with rubber dumb-bell or strip samples as used in a Schopper tensile testing machine.

The normal method employed for measuring the tensile strength of rubber is to submit a suitable shaped sample, such as the "dumb-bell" to a steadily increasing tension and to record the maximum tension attained before the sample breaks. Attempts have been made to observe also the extension of the sample under load, by measuring the increase in the distance between two marks on the sample. The measurement and recording of the increase in the distance is rendered difficult, however, by the flexibility of the sample and by the fact that neither of the marks on the sample remains stationary.

By the use of our extensometer these difficulties are overcome and an apparatus is provided for the continuous measurement and recording, if desired, graphically, of the distance between two marks on the rubber sample. The use of our extensometer is not restricted to rubber samples; it can be employed generally for the measurement and recording of a varying distance between two points, one or both of which are moving, on a material under examination.

According to our invention we provide means for measuring the extension under tension of a sample of rubber or the like which comprises transmitting, by means of levers, the motion of two points on the sample to two cams and two pivoted cam-followers, each cam being designed so that the angular motion of the cam-follower is directly proportional to the linear motion of the point on the sample, and utilising the difference in the angular motions of the cam-followers as a measure of the extension of the sample.

The transmission of the motion of two points on the sample to the two cams may be achieved by means of two light telescopic arms, co-pivoted with the cam at one end and attached at the other end to the rubber by, for example, a light spring clip, designed so as not to injure the rubber. In the Schopper tensile testing machine, the dumb-bell rubber sample is held in a vertical position and the tension is applied vertically downwards. Thus the motion of the rubber sample causes the telescopic arms to move in a vertical plane and to rotate the cams, the cam attached to the lower arm moving more rapidly than that attached to the upper arm. As said, the cams are designed to compensate the variation in length of the telescopic arms so that the angular motion of the cam-followers is directly proportional to the linear motion of the points on the sample.

In order to utilise the difference in the angular motions of the cam-followers a simple cord system may be employed wherein the resultant is a linear motion. This motion may be passed through a rack and pinion and a gear-train for magnification and power may be introduced by means of some servo mechanism, for example, a rotary cam operated microswitch causing electrical impulses to pass to a magnet operating, for example, through a ratchet wheel and cords, a carriage bearing a pen over a sheet of graph paper.

Figure 2:
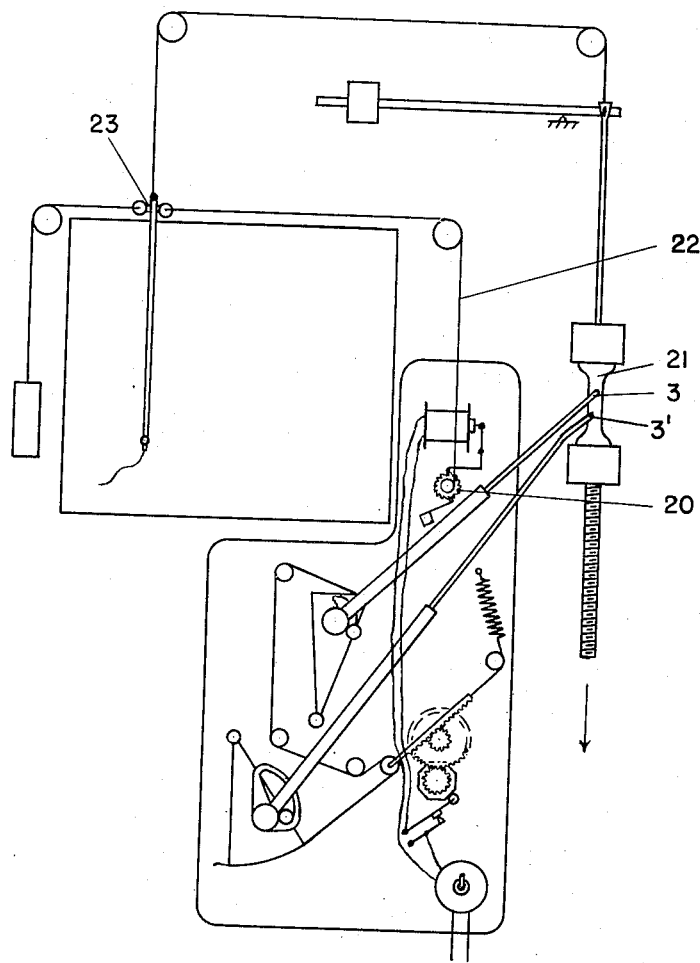
Figure 3:
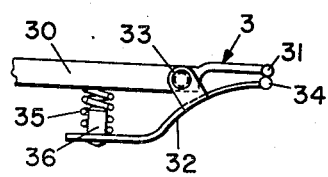

The invention is illustrated but not limited by reference to the accompanying drawings wherein Fig. 1 shows a front elevation of our extensometer, Fig. 2 shows a general arrangement in conjunction with a Schopper tensile testing machine, and Fig. 3 is a side elevational view, on enlarged scale, of a spring clip suitable for use in the invention.

In the drawings the sliding rod 1, arm 2 and spring clip 3 make up one telescopic arm pivoted on a pillar 4. The cam 5 attached to the telescopic arm operates cam-follower 6 attached to the arm 7 pivoted at 8. Sliding rod 1', arm 2' and spring clip 3' make up the other telescopic arm, pivoted on pillar 4'. Attached to arm 2' is a cam 5' which operates cam-follower 6' attached to the arm 7' pivoted at 8'. The cord 9 is secured to the cam-follower arms and passes around guide pulleys 10, 10' and 10", and sliding pulley 11 which is attached to a rack 12 held in a guide 13. A spring 14 is applied to the sliding rack 12 about a guide pulley 24 and serves to maintain a tension in the cord 9. The sliding rack engages with a gear-train 15 driving an eight-sided cam 16 which operates a switch 18 through a cam-follower 17. Electrical impulses from the switch operate a magnet 19 driving a ratchet-wheel 20.

The extensometer is attached to the slide rails of a Schopper tensile testing machine and the spring clips 3 on the telescopic arms are fixed to the dumb-bell rubber sample 21 at selected points (normally 1" apart).

A cord 22 is attached to the ratchet-wheel 20 and to the carriage 23.

As illustrated in Fig. 3, spring clip 3 may comprise a base member 30, the outer end of which is formed into a rounded engagement point 31.

A clip arm 32 is pivotally engaged to base member 30 by pivot pin 33. One end of clip arm 32 is formed into a rounded engagement point 34 opposed to the corresponding point 31, and points 31 and 34 are urged toward each other by a spring 35 interposed between base member 30 and clip arm 32, and retained by guide 36 extending from the clip arm.

Thus extension of the rubber sample is registered as a horizontal movement of the carriage and there is a linear relationship between the displacement of the carriage and the extension of the rubber sample. The tension applied is registered by the usual means as a vertical movement of a pen on the carriage and thus a stress-strain diagram is automatically drawn on a suitably mounted paper. The physical properties of the rubber, such as tensile strength, elongation and modulus, can be read from the stress-strain diagram so-obtained. By the use of our extensometer these stress-strain diagrams are very readily prepared by one operator with elimination of "personal error" in the measurements.

The maximum range of the extensometer shown in the drawings is about 1200% elongation of the rubber sample; for this elongation about 120 electrical impulses are emitted from the switch 18 and 4 revolutions are made by the ratchet-wheel 20; the carriage 23 is then moved through about 12 cms.

What we claim is:

1. Apparatus for measuring the extension under tension of a sample of rubber or the like which comprises a pair of telescopic arms each of which is co-pivoted at one end with a cam, each of said cams having a pivoted cam-follower, light spring clip members on the free ends of said arms to be attached to the sample of material being tested, all of said elements being arranged so that the angular motion of said cam-followers is directly proportional to the linear motion of the point of attachment of the said clip members on the ends of said telescopic arms, a movable indicating and recording carriage, and means for transmitting the motion of said cam-followers caused by the elongation of said sample being tested to said carriage.

2. Apparatus as claimed in claim 1 wherein a linear relationship exists between the movement of said carriage and the elongation of said sample.

3. Apparatus as claimed in claim 1 wherein said means for transmitting the movement of said cam-followers to said carriage includes a cord and pulley system associated with said cam-followers, a rack and pinion adapted to be driven by said cord and pulley system, and a gear-train engaged to said pinion and adapted to magnify the motion thereof.

4. Apparatus as claimed in claim 1 wherein said means for transmitting the movement of said cam-followers to said carriage includes a servo-mechanism for introducing power.

JACK MITCHELL BUIST.
GUILLAUME WARD JAMIN.

References Cited in the file of this patent

UNITED STATES PATENTS

| Number | Name | Date |
|---|---|---|
| 741,703 | Olsen | Oct. 20, 1903 |
| 1,627,366 | Williams | May 3, 1927 |
| 2,091,534 | Templin | Aug. 31, 1937 |
| 2,560,135 | Shearer | July 10, 1951 |